United States Patent [19]

Pierce et al.

[11] Patent Number: 5,713,238
[45] Date of Patent: Feb. 3, 1998

[54] SPRING BRAKE ACTUATOR WITH SPRING FORCE MEASUREMENT

[75] Inventors: William C. Pierce; William J. Hicks, both of Muskegon, Mich.

[73] Assignee: NAI Anchorlok, Inc., Muskegon, Mich.

[21] Appl. No.: 569,102

[22] PCT Filed: Aug. 17, 1994

[86] PCT No.: PCT/US94/09269

§ 371 Date: Dec. 12, 1995

§ 102(e) Date: Dec. 12, 1995

[87] PCT Pub. No.: WO96/05093

PCT Pub. Date: Feb. 22, 1996

[51] Int. Cl.$^6$ ................................ G01L 1/04; G01L 5/28
[52] U.S. Cl. ........................... 73/161; 73/121; 188/1.11; 92/63
[58] Field of Search ................ 73/161, 862.581, 73/700, 706, 744, 818, 121, 129; 116/208; 188/1.11, 170, 365; 92/63

[56] References Cited

U.S. PATENT DOCUMENTS

| | | | |
|---|---|---|---|
| 2,291,561 | 7/1942 | Reiss | 73/161 |
| 3,834,228 | 9/1974 | Wachholz | 73/161 |
| 3,978,722 | 9/1976 | Glotzl et al. | 73/862.581 |
| 4,196,623 | 4/1980 | Alinari | 73/300 |
| 4,658,936 | 4/1987 | Moseley | 188/1.11 |
| 4,805,740 | 2/1989 | Wilke et al. | 188/1.11 |
| 4,945,818 | 8/1990 | Ware | 188/1.11 |
| 4,989,537 | 2/1991 | Hutchinson, Sr. et al. | 116/208 |
| 5,002,164 | 3/1991 | Bowyer | 188/1.11 |

*Primary Examiner*—Daniel G. DePumpo
*Assistant Examiner*—Andrew Hirshfeld
*Attorney, Agent, or Firm*—Rader, Fishman, Grauer & Mc Garry

[57] ABSTRACT

Measuring the force of a spring (28) in a spring brake actuator (10) comprising a housing (14) having an end wall (46), a spring plate (30) within the housing (14), the spring (28) being disposed between the spring plate (30) and the housing end wall (46) and a caging bolt (34) extending from the spring plate (30) through the housing end wall (46) and having a nut (44) thereon with a gauge between the caging bolt nut (44) and the housing (14). The gauge comprises a pressure-responsive element which detects the compressive force between the nut (44) and the housing (14) and generates a signal responsive thereto. An indicator (86) is coupled to the pressure-responsive element and visually displays the force on the spring (28) as a function of the compressive force signal. An embodiment of the gauge (50) comprises a body (52) having a bore (58), a piston (64) received within the bore (58) defining a chamber (74) between the piston (64) and the body (52) and a fluid (72) in the chamber (74).

14 Claims, 3 Drawing Sheets

SPRING BRAKE ACTUATOR WITH SPRING FORCE MEASUREMENT

BACKGROUND OF INVENTION

1. Field of the Invention

This invention relates to a spring brake actuator with a gauge for measuring the spring force of a power spring in the actuator. In one of its aspects, the invention relates to a method for measuring the force of a spring in a spring brake actuator. In another of its aspects, the invention relates to a gauge for measuring the force of a spring in a spring brake actuator.

2. State of the Prior Art

Spring brake actuators are in common use with air brake systems used on trucks, buses, and towed vehicles. Such actuators normally include a service brake actuator for applying and releasing the brakes in response to delivery and exhaust of compressed air and a spring brake actuator disposed in tandem with the service brake actuator. The spring brake actuator uses spring force to operate the service brake actuator and apply the brakes when the air in a spring brake actuator chamber is reduced below a predetermined pressure. Air pressure may be reduced in this chamber under the control of the operator to apply the brakes or automatically as a result of failure of portions of the service brake air system.

Typically, a barrel-shaped spring is used to store energy and to exert the large force required for braking in the event of air pressure failure. Air pressure in the chamber acting on a movable wall is employed to compress the spring and maintain it in a retracted position. When the air is exhausted from the chamber, the spring acts on the movable wall, typically a diaphragm or a piston, and through an actuating rod to exert the spring force on the service actuator to apply the brakes.

It is desirable to measure the spring force of the spring to ensure that it is operating within design parameters. However, disassembly of the spring brake actuator to remove the spring and test it outside the actuator does not measure its operating effectiveness on the vehicle. Moreover, many spring brake actuators now permanently enclose the power spring, making removal of the spring for testing purposes impractical.

SUMMARY OF THE INVENTION

According to the invention, a gauge measures the force of a power spring in a spring brake actuator comprising a housing having an end wall, a spring plate disposed within the housing, a power spring between the spring plate and housing end wall, and a caging bolt extending from the spring plate through the housing end wall and having a nut thereon exterior of the housing. The gauge comprises a pressure-responsive element adapted to be positioned between the caging bolt nut and the spring housing for generating a signal representative of the compressive force of the spring and an indicator coupled to the pressure-responsive element to visually display the force of the spring as a function of the pressure signal. Typically, the pressure-responsive element comprises a first member adapted to receive the nut in abutting engagement and a second member adjacent the first member and adapted to abut the housing. The first member is movable relative to the second member in response to compressive force applied to the nut by the power spring acting against the spring plate. The gauge measures the compressive force between the nut and the spring housing so that the force applied by the power spring can be measured in situ. The invention provides quick and accurate in situ measurement of the force of the power spring. Also, measuring the force of the spring with the brake installed in its operating environment improves accuracy over measurements taken on brakes removed from the vehicle.

Preferably, the first and second members each have an aperture aligned to slidably receive the caging bolt. Also, the second member preferably comprises a body having a bore, the first member comprises a piston received within the bore, and the gauge further comprises a pressure-responsive fluid between the piston and the body for resisting an applied compressive force and the pressure signal is a fluid pressure. The indicator is connected to the pressure-responsive fluid for sensing and displaying the applied compressive force. Preferably, the indicator is a pressure sensor for measuring a pressure in the fluid and a display for displaying the spring force as a function of the pressure measurement. The pressure sensor can be calibrated to display the pressure reading in spring force units. Preferably, a threaded adjusting aperture is provided through the body into the chamber and a screw is threaded into the adjusting aperture to adjust the volume of the chamber to calibrate the gauge.

Further according to the invention, a method for measuring the force of a spring in a spring brake actuator comprising a housing, a spring plate within the housing, a power spring between the spring plate and housing and a caging bolt extending from the spring plate exterior of the housing and having a nut thereon comprises the steps of: detecting the pressure between the housing and the nut; generating a signal representative of the detected pressure; and visually displaying an indication of the detected pressure as a function of the compressive force exerted by the power spring.

Further according to the invention, a spring brake actuator comprises a housing having an end wall, a spring plate disposed within the housing, a power spring between the spring plate and the housing end wall, and a threaded caging bolt extending from the spring plate through the housing end wall, a nut on the caging bolt exterior of the housing and a force-measuring gauge between the housing and the caging bolt nut to measure the force exerted by the power spring. The gauge comprises a pressure-responsive element for detecting the compressive force between the housing and the caging bolt nut and for generating a signal representative of the compressive force, and an indicator coupled to the pressure-responsive element to visually display the force of the power spring as a function of the representative signal. Thus, the force applied by the power spring can be measured in situ.

Preferably, the caging bolt further comprises at least one marking along the length thereof for positioning the nut thereon, wherein when the nut is aligned with the at least one marking and the spring is applying a force to the spring plate, the spring will be at 50% of its maximum extension length or other predetermined length.

BRIEF DESCRIPTION OF THE DRAWINGS

The invention will now be described with reference to the accompanying drawings in which.

DESCRIPTION

Figure 1:
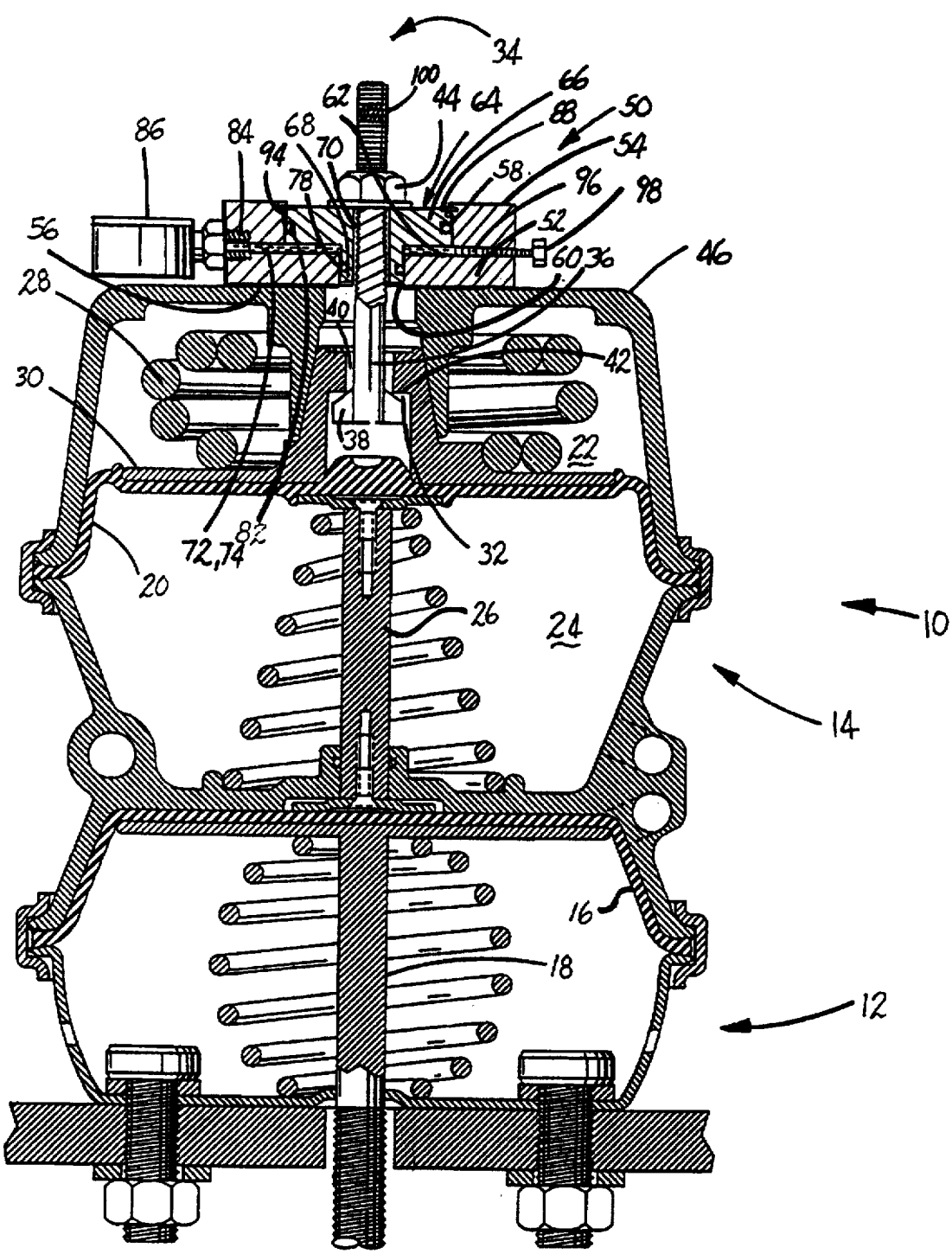
FIG. 1 is a cross-sectional view of a spring brake actuator with a spring force gauge according to the invention.

Referring now to the drawings and to FIG. 1 in particular, there is shown an air operated diaphragm spring brake 10 of the type disclosed in the Ware U.S. Pat. No. 4,860,640 issued Aug. 29, 1989, incorporated herein by reference. The air operated spring brake 10 comprises a service brake housing 12 and spring housing 14 joined together in tandem. A diaphragm 16 disposed within the service chamber 12 operates against a pushrod 18 in a conventional manner to actuate the vehicle braking system (not shown). A second diaphragm 20 divides the spring housing 14 into a spring chamber 22 and a pressure chamber 24. An actuator rod 26 extends from the spring housing diaphragm 20 through the pressure chamber 24 and into the service housing 12. A powerful barrel-shaped spring 28 is disposed in the spring chamber 22 between the spring housing 14 and a pressure plate 30. The pressure plate 30 abuts the spring housing diaphragm 20. When fully retracted, the spring 28 applies a force of approximately 3,000 pounds against the pressure plate 30.

During normal operation of the spring brake 10, a constant pressure is applied to the pressure chamber 24, thereby holding the spring 28 in a retracted position as shown in FIG. 1. When pressure is released from the pressure chamber 24, the spring 28 extends and presses the actuator rod 26 into the service housing 12.

Typically, a receptacle 32 is provided in association with the pressure plate 30 for receiving a caging bolt 34 so that the spring 28 can be manually compressed and the actuator rod 26 retracted. Manual retraction would be required, for example, when the brakes must be released, but there had been a failure in the emergency brake air system. As more clearly shown in FIG. 2, the caging bolt 34 comprises an elongated threaded rod 36 having a pair of radially extending projections 38 at one end thereof. The receptacle 32 has a keyed entry aperture 40 for receiving the caging bolt projections 38. After the caging bolt 34 is fully received with the receptacle 32 it is rotated 90° so that the projections 38 engage an annular shoulder 42 within the receptacle 32. Referring again also to FIG. 1, the caging bolt threaded rod 36 extends out of the spring housing 14 through an end wall 46 thereof wherein withdrawal of the caging bolt 34 will retract the pressure plate 30 to compress the spring 28. Typically, a nut 44 is threaded onto the caging bolt threaded rod 36 and torqued to a predetermined level to fully withdraw or "cage" the power spring 28.

Figure 2:
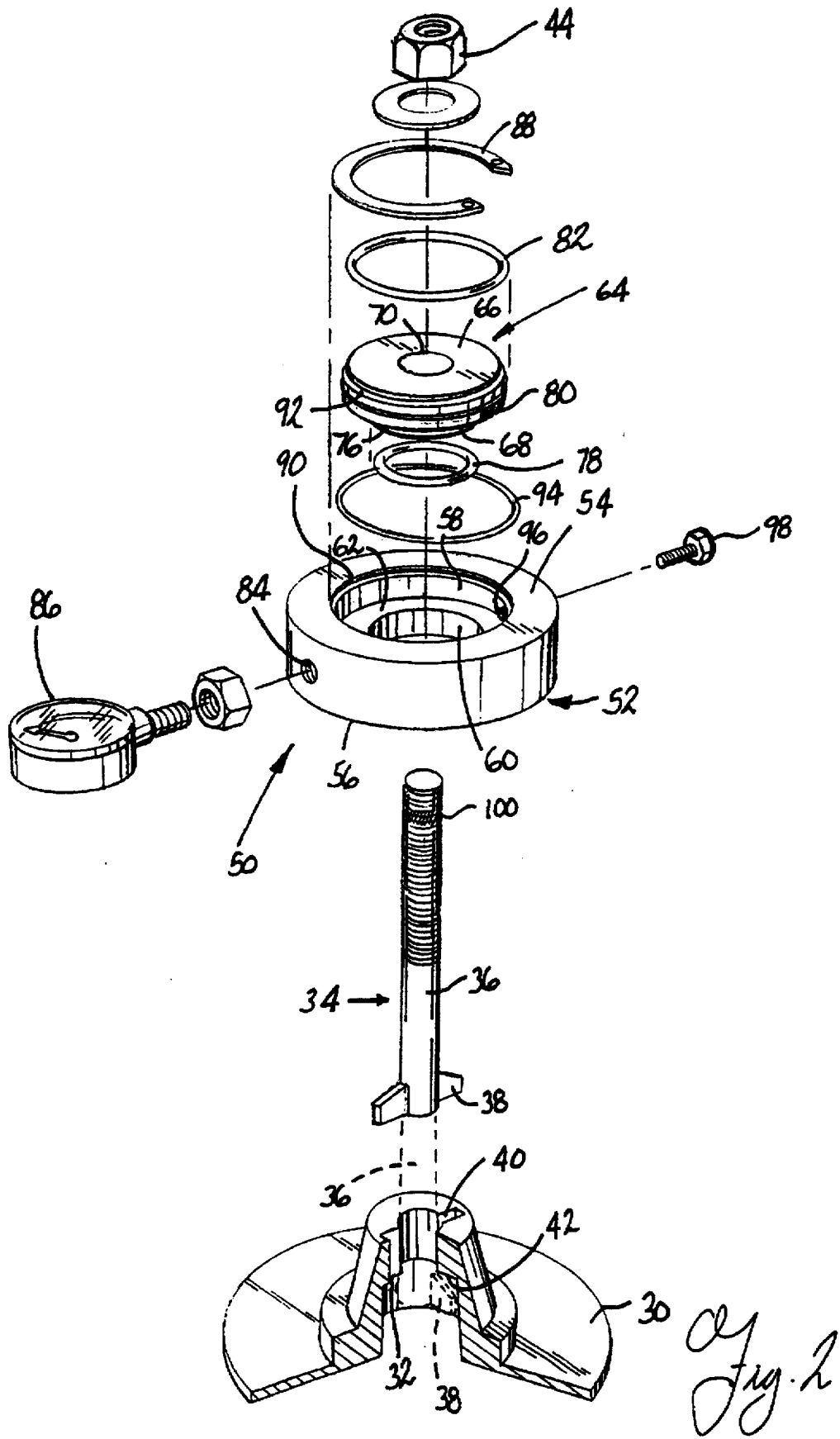
FIG. 2 is an exploded view of a portion of the spring brake actuator of FIG. 1 and the spring force gauge of FIG. 1.

As shown in FIGS. 1 and 2, a gauge 50 according to the present invention is interposed between the nut 44 and the spring housing 14 to measure the compressive force of the power spring 28. Thus, the gauge 50 enables one to test the compressive force of the spring 28 without removing the spring 28 from the spring housing 14, or otherwise disassembling the spring housing 14.

The gauge 50 comprises a discoidal body 52, the body 52 having an upper face 54 and a lower face 56. A first coaxial bore 58 extends partially into the body 52 through its upper face 54. A second, smaller diameter, coaxial bore 60 extends into the body 52 from the lower face 56 to intersect the first bore 58, thereby forming an annular shoulder 62 within the body 52 at the intersection of the first and second bores 58, 60. A piston 64 is disposed within the body 52 and comprises a discoidal head 66 disposed within the first bore 58, an annular collar 68 extending axially from the head 66 and disposed within the second bore 60. A coaxial bore 70 extends therethrough. A fluid chamber 74 defined in part by the piston head 66 and the annular shoulder 62 holds an incompressible fluid 72. An annular groove 76 about the annular collar 68 receives an O-ring 78 and a second annular groove 80 about the piston head 66 receives a second O-ring 82 to seal the fluid 72 within the fluid chamber 74.

A threaded port 84 extends radially through the gauge body 52 into the fluid chamber 74 and receives a fluid pressure indicator 86. The caging bolt 34 extends through the bore 70 with the nut 44 threaded onto the caging bolt 34 in abutting engagement with an upper surface of the piston head 66. Thus, force applied by the spring 28 to the pressure plate 30 is transmitted through the caging bolt 36 and the nut 44 to the piston 64 thereby urging the piston 64 toward the annular shoulder 62, resisted only by the fluid 72. The resultant increased pressure in the fluid is displayed by the pressure indicator 86. It is preferable for the indicator 86 to be calibrated to read the force of the spring 28 as opposed to the actual pressure in the fluid 72.

A snap ring 88 received within an annular groove 90 in the gauge body 52 and adjacent the open end of the first bore 58 abuts an annular shoulder 92 on the piston 64 to hold the piston 64 within the gauge body 52. An additional combined O-ring and plastic guide 94 may be provided between the piston 64 and gauge body 52 adjacent the snap ring 88.

Provision is also made for calibrating the gauge 50. A threaded adjusting aperture 96 extends radially through the body 52 into the fluid chamber 74 and receives a threaded adjusting screw 98. The adjusting screw 98 permits adjustment of the volume of the fluid chamber 74 in order to calibrate the gauge 50. For instance, threading the screw 94 into the adjusting aperture 92 reduces the volume of the fluid chamber and produces a correspondingly higher reading in the pressure gauge 86.

Industry standards for measuring the force of the compression spring 28 call for reading the force measurement at 50 percent of the maximum stroke of the spring 28. Accordingly, the caging bolt 34 is preferably provided with a marking 100 on its threaded portion 36 which, when aligned with the nut 44, corresponds to 50 percent of the maximum stroke of the spring 28. So that the caging bolt 34 can be employed with more than one type or model of brake actuator, it may be provided with multiple markings 100 corresponding to the various brake actuators for which it is contemplated. Preferably, the markings 100 will comprise a knurling in combination with a color coding. Also, the indicator 86 may be calibrated with a "go," "no go" scale such as a red zone and green zone (not shown) to readily indicate whether the spring 28 is applying force within design tolerances. Also, separate indicator faces may be provided for separate types of brake actuators.

To read the force of a spring 28 in a given brake actuator 10, the caging bolt 34 is first inserted into the receptacle 32 and properly seated therein. The gauge 50 is then received over the caging bolt 34 with the body lower face 56 abutting the spring housing 14 and the bore 70 receiving the caging bolt threaded rod 36. The nut 44 is threaded onto the caging bolt threaded rod 36 and tightened to the predetermined location indicated by the marking 100. To ease the burden of tightening the nut 44, pressure can be applied to the pressure chamber 24, thereby retracting the spring 28 so that the nut 44 can be freely threaded onto the caging bolt 34 to its desired location. If pressurization of the pressure chamber 24 is impractical, the nut 44 can be threaded onto the caging bolt 34 in the conventional manner. When the nut 44 is properly positioned and the pressure is released from the pressure chamber 22, the indicator 86 will visually display the force applied by the spring 28 at 50 percent of its maximum stroke. Preferably, the gauge 50 will be calibrated with the adjusting screw 98 prior to each use, with the adjusting screw 98 being adjusted so that the indicator 86 displays zero pressure when no force is applied to the piston 64.

Figure 3:
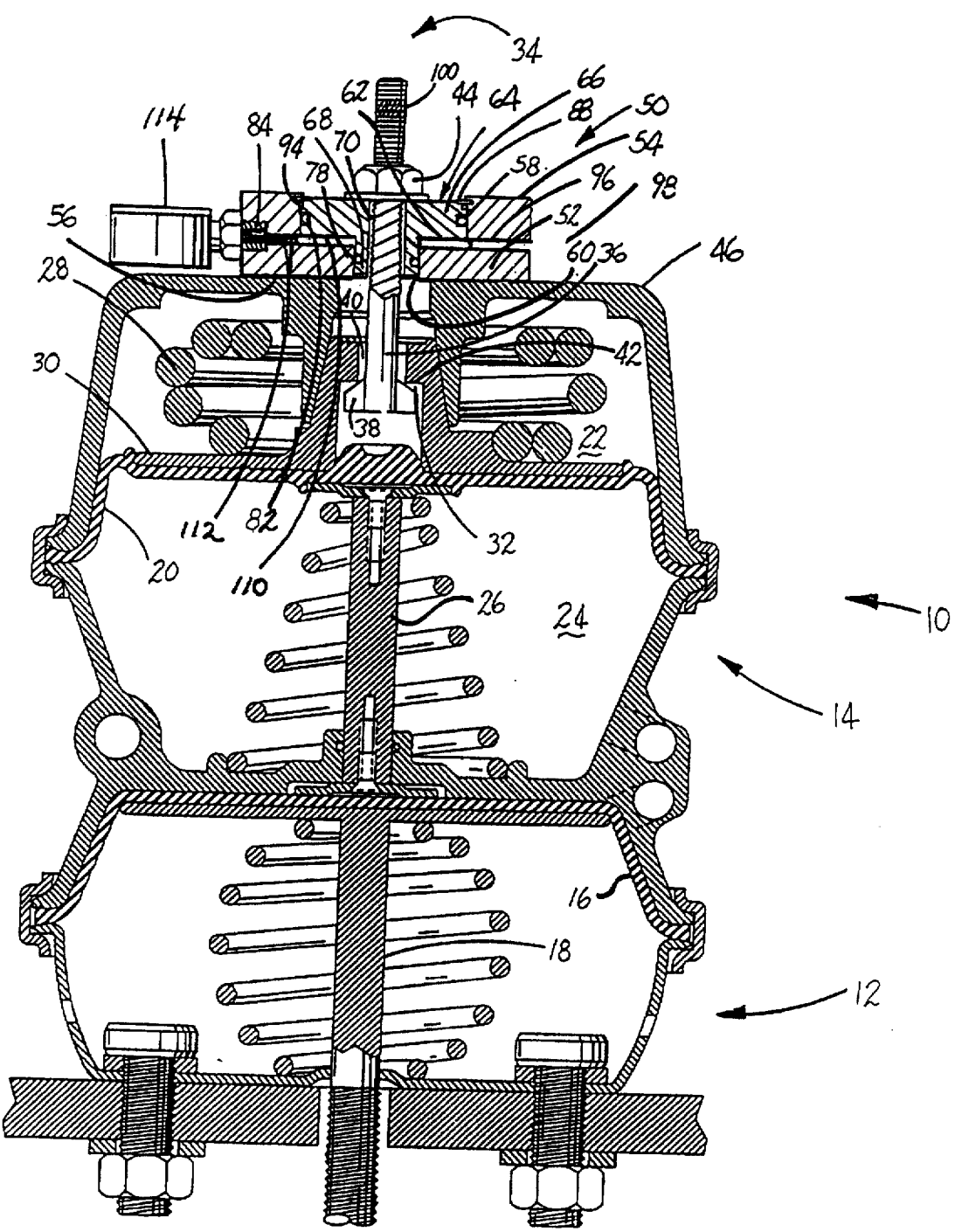
FIG. 3 is a cross-sectional view of a spring brake actuator with a spring force gauge according to a second embodiment of the invention.

Reasonable variation and modification are possible within the scope of the foregoing disclosure of the invention without departing from the spirit of the invention. For instance, the gauge 50 may take other forms than an incompressible fluid gauge as illustrated in FIGS. 1 and 2. For instance, as shown in FIG. 3, wherein like parts in the previous embodiment are represented by like numerals, a piezoelectric crystal 110 can be used to electronically detect the compressive force between the nut 44 and the housing 14 and to generate an electrical signal representative thereof. A pair of wires 112 extend from the piezoelectric crystal 110 to a gauge 114 that processes and displays the electronic signals from the crystal 110 in a well known manner. Also, other mechanical means may be employed such as a plurality of stacked Belville springs or an elastomeric insert with the force readout comprising a change in the spatial relationship between the piston 64 and body 52. It is to be understood that the description of the particular embodiments contained herein is by way of illustration and not limitation, and that the scope of the appended claim should be construed as broadly as the prior art will permit.

What is claimed is:

1. A method for measuring the force of a spring in a spring brake actuator comprising a housing, a spring plate within the housing, wherein the spring is positioned between the spring plate and the housing, and a caging bolt extending from the spring plate exterior of the housing and having a nut thereon, the method comprising the steps of:

detecting the compressive force between the caging bolt nut and the housing;

generating a signal representative of the detected compressive force; and visually displaying the force of the spring as a function of the compressive force signal.

2. A method according to claim 1 wherein the compressive force signal is a fluid pressure.

3. A method according to claim 1 and further comprising the step of adjusting the nut on the caging bolt so that the spring is at 50% of its maximum extension before the detecting step.

4. A method according to claim 1 wherein the compressive force signal is an electrical signal.

5. In a spring brake actuator comprising:

a housing having an end wall;

a spring plate disposed within the housing;

a power spring between the spring plate and the housing end wall;

a threaded caging bolt extending from the spring plate through the housing end wall; and a nut on the caging bolt exterior of the housing, the improvement comprising:

a force measuring gauge mounted between the housing end wall and the nut, the gauge comprising:

a pressure-responsive element between the caging bolt nut and the housing end wall to detect the compressive force therebetween and for generating a signal representative of said compressive force; and an indicator coupled to the pressure-responsive element for visually displaying the force of the power spring as a function of the compressive force signal, whereby the force exerted by the power spring can be measured in situ.

6. A spring brake actuator according to claim 5 wherein the pressure-responsive element comprises:

a first member abutting the nut;

a second member adjacent to the first member and abutting the housing end wall, said first member being movable relative to the second member in response to a force of the power spring acting on the nut through the spring plate and the caging bolt.

7. A spring brake actuator according to claim 6 wherein the members each have an aperture, said apertures are aligned and the caging bolt extends through the apertures.

8. A spring brake actuator according to claim 7 wherein the second member comprises a body having a bore, the first member comprises a piston received within the bore and defining a chamber between the piston and the body, and the pressure-responsive element further comprises a pressure-responsive fluid in the chamber for resisting the compressive force.

9. A spring brake actuator according to claim 8 wherein the signal generated by the pressure-responsive element is fluid pressure which is a function of the fluid pressure in the chamber.

10. A spring brake actuator according to claim 9 wherein the indicator is calibrated to display a reading in spring force units.

11. A spring brake actuator according to claim 8 and further comprising a threaded adjusting aperture through the body into the chamber and a screw threaded into the adjusting aperture whereby the volume of the chamber can be adjusted to calibrate the gauge.

12. A spring brake actuator according to claim 5 wherein the power spring further has a maximum extension length and the caging bolt further comprises a marking for positioning the nut thereon, wherein when the nut is aligned with the marking and the spring is applying a force to the gauge, the spring will be at 50% of its maximum extension length.

13. A spring brake actuator according to claim 5 wherein the signal generated by the pressure-responsive element is a fluid pressure.

14. A spring brake actuator according to claim 5 wherein the signal generated by the pressure-responsive element is an electrical signal.

* * * * *